Patented Jan. 14, 1947

2,414,414

UNITED STATES PATENT OFFICE 2,414,414

METHOD OF BONDING MATERIALS WITH A COLD-SETTING DIHYDROXY BENZENE ALDEHYDE ADHESIVE

Philip Hamilton Rhodes, Portland, Maine, assignor to Pennsylvania Coal Products Company, Petrolia, Pa., a corporation of Pennsylvania No Drawing. Application October 6, 1942, Serial No. 461,038

6 Claims. (Cl. 154—133)

The present invention relates to the production of a dihydroxy benzene aldehyde resin adhesive and its utilization as a bonding medium in the production of industrial articles, including laminated products, plywood, laminated wood and composite laminated pieces containing component laminae selected from the group comprising rubber, leather, metals, alloys, cellulosic materials, synthetic plastics, and the like.

More specifically the present invention relates to the production of articles, the component parts of which are united together, or bonded with, a resin adhesive comprising a condensation product resulting from a mixture of a dihydroxy benzene and an aldehyde containing aldehyde components, including aldehyde radicals in an amount insufficient to cause the resin to set to an infusible, insoluble state, said adhesive having compounded therewith an active methylene-containing compound which is added to the resin adhesive just prior to the time that same is to be utilized for bonding purposes.

In one form of the present invention a resin of the character above set forth is brought into solution and is applied to the surfaces of the articles to be glued or united. The coating is preferably, although not necessarily, allowed to dry and thereafter the coating is treated with an active methylene-containing component. Within a reasonable period thereafter, and before the active methylene compound has initiated any substantial set in the resin, the component parts of the article are placed together and sufficient pressure is applied to hold said component parts together during the time the so-compounded adhesive sets and develops its bonding strength.

In another form of the invention, a resin of the character set forth is brought together with a material containing an active methylene-containing compound in the presence of a liquid medium and the resulting mass is applied to the surface to be bonded, before said methylene-containing compound has an opportunity to react with the resin and initiate any substantial set thereof. In one form of the invention a methylol compound may be used which contains a reactive CH₂OH group, which is a hydroxy methylene radical. The term "reactive methylene-containing radical" as used herein includes the reactive radical CH₂ and the reactive radical CH₂OH.

After the application of the so-prepared adhesive, the methylene-containing compound begins to act on the resin and initiates the set-up thereof. The liquid medium above referred to may be water or an organic or inorganic medium which favors the addition of the methylene-containing compound, or the methylene radicals, thereof, to the resin.

In another form of the invention a resin of the character above set forth, in a solid state, preferably finely divided, is compounded with a material in a finely divided, dry state containing a setting agent which rapidly becomes active when the mixture containing the same is treated with a liquid medium, and applied in a suitable consistency to the article to be bonded. Preferably, in this form of the invention, the setting medium contains an active methylene compound, or is one which contains methylol radicals. In this connection, it is desired to point out that the active methylene compounds and the methylol compounds rapidly set-up the adhesive and this is necessary. Inasmuch as the adhesive of the present invention is set-up at rather low temperatures, preferably varying between 30° F. and 70° F., it is quite necessary that the setting agent function rapidly. Further, it is desired to point out that cold-setting glue, in order to be commercially usable, must set-up within a reasonable period, that is within between 1 to 16 hours and preferably within 1 to 8 hours when the temperature varies between 30° and 70° F. The cold-setting adhesive of the present invention gives exceedingly satisfactory results when the adhesive sets within a temperature range of 60° to 120° F. for a period varying between 1 and 4 hours. Therefore it is quite important that the setting medium start to function during the early part of the 4 hour period and rapidly continue to do so and fully develop a good bonding strength, it of course being recognized that even after this period the adhesive continues to set and gain in strength.

The following is an example showing the preparation and utilization of a suitable adhesive in accordance with the present invention:

The resorcin formaldehyde resin having aldehyde radicals in an amount insufficient to cause the resin to set to an infusible, insoluble state, may be produced in the following manner:

About 2500 grams of resorcin are reacted with 500 grams of 37% formaldehyde solution in a suitable reaction vessel. Preferably, the reaction vessel comprises a steam jacketed kettle equipped with a horse-shoe agitator, a reflux condenser, and an addition valve. The formaldehyde is added to the resorcin present in the vessel and thereafter the jacket is gradually heated so that the temperature of the resorcin formaldehyde mixture is slowly raised to 100° C. as the resorcin goes into solution, great care being taken that the mixture does not become too ebullient, and boil over. As the temperature reaches 100° C., the steam jacket is taken out of circuit and then about 750 grams of 37% formaldehyde are gradually added to the kettle. The rate of addition is governed by the temperature of the mixture. The particular mixture above set forth is not permitted to become heated to over 110° C., no boiling over occurring. As the formaldehyde is added to the partially reacted mass, heat is generated and the rate of reaction is controlled so that the heat given off is not sufficient to cause the mass to boil over. Usually the formaldehyde is added gradually in increments, the time of addition being usually about 1¼ to 1½ hours. However, this will vary with the size of the reaction mass and on large scale production, may take as long as two or three hours.

During the last of the addition of the formaldehyde to the partially reacted mass, the rate of reaction slows down and there usually remains in the reaction mass about 5 to 10% of formaldehyde which has not yet combined with the resorcin. In order to combine this last increment of uncombined formaldehyde without successive advancement of the resin already formed, a catalyst is added as soon as the addition of the formaldehyde is complete. If this is not done and the formaldehyde is completely combined by the long application of heat, part of the resin formed in the initial stages of the reaction will advance so far as to threaten gelation and perhaps inhibit the complete removal of the water. In the above, no catalyst is present. However, if a catalyst is added in the early stages of the reaction, the initial resin formation advances before the final increment of formaldehyde is tied up and thickens the mass so that it is difficult to remove the water from the reaction mass.

If the total time of running the above resin batch from the quantities set forth is 2½ to 2¾ hours, the extent of dehydration is such that the residual moisture remaining in the processed resin varies between about .5 to .7%. However, if the time of the reaction is slowed down to 3¼ to 3½ hours, the residual moisture may be on the average about 1 to 1.5%. When utilizing larger batches and different processing apparatus, the time of a slow reaction and the time of a rapid reaction may vary, but the relative dehydration results will remain approximately comparable; that is, for the shorter reaction period, the dehydration will be more complete.

The addition of the catalyst toward the end of the reaction ties up the last amounts of formaldehyde quickly before the resin already formed has a chance to advance too far and prevent the complete dehydration of the final product. When all the formaldehyde has been added, there is then added a suitable acid catalyst such as oxalic acid, acetic acid, citric acid, boric acid or any of the mineral acids such as sulfuric acid and hydrochloric acid. Specifically, to the mixture above set forth there may be added sufficient oxalic acid crystals to assist in completing the reaction. When the reacting ingredients are present in the proportions above set forth, 5 grams of oxalic acid crystals are sufficient to complete the reaction. Instead of adding the catalyst in a dry state, the latter may be added in solution, as for example, the oxalic acid crystals may be dissolved in water or equivalent medium.

During the time that the second addition of formaldehyde is added, heat is furnished by the exothermic reaction of the formaldehyde with the resorcin. At about the time the catalyst is added, the mass begins to slightly cool and the jacket is reheated, sufficient steam being bled in to rapidly reflux the kettle contents. As soon as the mixture has reached a smooth rapid reflux the condenser is shifted to a water jacketed downward condenser connected to a trap and vacuum pump to distill off the water from the reaction mass. The temperature is maintained by steam pressure on the jacket at about 100° C. during the distillation of the water and a vacuum of about 28 inches is maintained on the system. Distillation is continued with about 50 pounds of steam pressure on the jacket and the temperatures gradually rise to 125° to 130° C. at the end of the dehydration period. The dehydration is terminated when the temperature reaches 125° to 130° C. and the distillation is practically stopped. This can be ascertained by checking on the condenser output. When it slows down to 6 or 10 drops per minute, which takes about 45 minutes using the proportions herein set forth, this may be taken as an indication that the dehydration step has terminated. At this point, the agitator is stopped, the kettle is opened, and the liquid resin is poured off. This solidifies to a brittle resin containing less than 1% moisture and usually not over 0.65% as determined by the A. S. T. M. method. Preferably, the reaction is carried out between .67 of a mol of formaldehyde and one mol of resorcin in the presence of a suitable acid catalyst added as soon as the final portion of the formaldehyde or other aldehyde has been added. Although the preferred molecular ratio of formaldehyde to resorcin is 0.67 to 1.0, other ratios from 0.5 to 1.0 to 0.9 to 1.0 may be employed. Instead of using formaldehyde, other prior art aldehydes may be used such as acetaldehyde, paraldehyde, propionaldehydes, the butyl aldehydes, the furfuraldehydes, and the like.

Mild alkaline catalysts such as .5% sodium hydroxide, .2% borax, azoxy-toluidine, aniline and other alkaline catalysts may be used, the latter being preferably added at the same point as the herein described acid catalyst is added; namely, after the complete addition of the formaldehyde or equivalent aldehyde.

The percentage of catalysts is taken upon the amount of dihydroxy benzene, as for example, resorcin, used in carrying out the reaction. In general, the catalyst will vary between about .1% to 2%. This is set forth by way of illustration and as the preferred percentage of catalyst. Obviously, however, the amount of catalyst used will vary depending upon the character of the reacting constituents and the specific manner in which the reaction is carried out. The method of producing the resorcin formaldehyde resin above set forth appears on pages 2 and 3 of applicant's Patent No. 2,385,372, granted September 25, 1945, on an application filed January 13, 1942, said method being covered by the claims of said patent.

The brittle resin produced as above set forth is preferably ground to about 40 mesh and 50 lbs. thereof is mixed with about 50 to 70 lbs. of water and the mixture heated slightly to cause the resin to form a homogenous liquid mass, there being some doubt that the resin actually goes into solution. Usually the mass is heated to about 80 to 90° C. but this is set forth by way of illustration and not by way of limitation. Obviously cold water may be used but the resin will take a longer period to go into solution. The solution of the resin, as prepared, is exceedingly stable and will keep for an indefinite period of time and is substantially unaffected by climatic changes. This solution of the resin, produced as above set forth, may be utilized as an adhesive for many purposes. For the purpose of illustration, its application to the production of a plywood panel will be set forth. The plywood panel may consist of a core member and a face and back ply member. To the inner surface of the face member and to the inner surface of the back member and to both surfaces of the core, the above-prepared resin is applied so that the application results in a deposition of 7½ to 25 lbs. on a dry weight basis per 1,000 square feet of each surface. The adhesive is deposited at room temperature and thereafter the plies may be laid away until the time arrives for them to be assembled with the core. One of the advantages of the present adhesive is that the so-treated plies may be laid away for any period of time whatsoever and the resin which has been applied will not suffer any detrimental effects. Plies coated with the so-prepared adhesive will, as stated, stand substantial periods of time without any detrimental effect, as for example four weeks, four months or four years. These figures are merely illustrative to indicate that the resin will not set-up until a setting agent has been applied thereto.

Just before the plies are assembled with the core to form the panel, there is applied to the face and back of the core a solution of the setting agent containing either active methylene radicals or active methylol radicals.

The above plywood panel consisted of all fir members. When the setting agent is a solution of 37% of formaldehyde, the spread should vary from about 3 to about 8 lbs. per 1,000 square feet of single glue line, taken on a wet basis.

The coating of the setting agent is preferably allowed to dry for a suitable time, as for example 5 to 10 minutes, to initiate reaction and allow some of the water to be evaporated. When reaction is initiated, upon clamping some of the pieces together, the adhesive has developed a slight initial set which prevents it from being squeezed out from the plies and weakening the final bond, due to the presence of insufficient bonding agent. Referring to the above, it is to be noted that the resin component of the final adhesive was applied to a fir panel which may be classified as a low density wood. If the resin component is applied to a wood of high density as for example beech, birch or maple, then the period of delay after applying the setting agent should be greater than when the setting agent is used in connection with the bonding of low density woods. For example, if a birch panel is treated after the liquid formaldehyde setting agent is applied in the amount above set forth, it will be desirable to wait about 15 to 25 minutes before the members of the panel will be ready to be laid up and pressure applied by any of the well-known prior art methods such as presses, C-clamps, nailing, weights and the like.

If the panel was made of a medium density wood, such as soft maple, gum, or mahogany, a period from 15 to 20 minutes should preferably elapse before the plywood members are laid up and united into a panel. It is obvious that the time which is allowed to elapse between the application of the setting agent and the time when the members of the panel are assembled and bonded together will vary with the particular kind of methylene-containing setting agent or methylol-containing setting agent used and the character of the wood from which the panel members are made. Very frequently, the panel is made of a plurality of different kinds of woods, or plurality of different kinds of materials, and this must be taken into consideration in formulating the period which should be allowed to elapse after the setting agent has been applied.

Instead of utilizing a solution of 37% formaldehyde as a setting agent, a solution of polymethylol phenol may be used, said solution being preferably prepared in the following manner: 94 grams of phenol are mixed with about 200 c. c. of water containing 50 grams of sodium hydroxide, and to this mixture is added 215 grams of 37% formaldehyde solution. The above ingredients are mixed at room temperatures, that is at about 20° to 25° C. The mixture of the above constituents is allowed to stand for a substantial period of time in order that the reaction may be completed. The reaction should be carried out at a temperature which will not induce any substantial polymerization of the simple polymethylol phenol which is formed. Experiments indicate that if the temperature rises substantially above 40° to 45° C., that there is a tendency for polymerization to be initiated. It is not desired to be strictly limited to this temperature as with different amounts of the reacting constituents and different concentrations, the temperature may vary considerably from the above. However, the criterion is that the temperature should be maintained at that point which will prevent the initiation of polymerization of the polymethylol phenol.

Since the temperature is maintained at a comparatively low degree, it is necessary that a specific period of time be allowed to react the mix; preferably a batch prepared from the above constituents is allowed to stand from 1 to 3 weeks. The final product is a buttery mass, muddy brown in color, mainly the sodium salt of a polymethylol phenol, containing the methylol radicals attached to the phenol ring in such a state that in water solution the methylol radicals are readily available and become active substantially immediately upon said composition being brought in contact with the resin which is to be set up. Very satisfactory results have been obtained using a 50% solution of the above sodium salt of a polymethylol phenol. The major constituent of the reaction product above set forth may be set forth as polymethylol sodium phenate.

Instead of using the sodium salt of a polymethylol phenol, the following compounds containing active methylol radicals may be used in solution as a setting agent; methylol para cresols, methylol resorcinol, methylol xylenols, methylol ureas including di-methylol ureas, methylol thiourea including di-methylol thiourea, and methylol melamines. The above compounds are representative of aromatic, aliphatic and heterocyclic compounds containing the active methylol radical $CH_2OH$, which is the important radical or group of the compounds above set forth in effecting the setting of the dihydroxy benzene aldehyde resins, derived from a mixture containing insufficient aldehyde radicals to cause the resin to set to an infusible, insoluble state. In other words, the dihydroxy benzene aldehyde resins which are used in conjunction with the setting agents herein set forth are those resins which are not heat-reactive, being prepared from a mixture of reacting constituents in which the molecular ratio of aldehyde to resorcin is less than 1:1. Therefore the above examples are by way of illustration and not by way of limitation and obviously, any organic compound may be used which will furnish the methylol radical in a highly active state, said compound not deleteriously affecting the dihydroxy benzene aldehyde resin produced as herein set forth.

While the solution of formaldehyde will function as a setting agent in 1 to 4 hours, that is will confer upon the article being bonded a standard bonding strength within said period, the methylol setting agent takes from 4 to 16 hours to induce in the dihydroxy benzene aldehyde resin a standard strength. In order that it may be clear what is meant by a standard strength, when members of a high density wood such as beech, birch and maple are bonded at a temperature varying between 60° and 80° F. there should be developed, when formaldehyde solution is used as a setting agent, within 1 to 8 hours a shear strength broadly varying between 290 and 400 lbs., per square inch and preferably varying between 380 and 400 lbs. per square inch.

When a medium density wood such as soft maple, gum or mahogany is bonded using a formaldehyde solution as the setting agent, there should be developed between 1 to 8 hours a bond having a shear strength varying between 200 to 325 lbs., per square inch, and preferably 300 to 325 lbs. per square inch.

In bonding members of a low density wood, such as poplar or spruce, with an adhesive which has been set with a formaldehyde solution, the bond should develop a shear strength of between 200 to 275 lbs. per square inch in 1 to 8 hours and preferably 240 to 275 lbs. per square inch within 1 to 8 hours.

When compounds containing the active methylol radical are used as the ultra setting or hardening agent of the present invention, the maximum strengths above set forth for the different kinds of woods should be developed in 8 to 16 hours. In other words, while the methylol-containing compounds may be used as a setting agent in carrying out the present invention, they are slower acting in causing the bonding material to develop the requisite bond shear strength.

Materials bonded with the adhesives herein set forth may be submerged in boiling water for 6 to 10 hours with no sign of failure.

The principles of the present invention may be utilized in the preparation of an adhesive medium containing a resin of the character herein set forth and the setting agent, said adhesive medium to be used shortly after its preparation before the setting medium has initiated any substantial set in the bonding medium. For example, 100 parts of any resin of the character herein disclosed and particularly the resin whose method of preparation has been described, are mixed with about 30 to 50 parts of 37% formaldehyde, the resin being preferably ground to about 100 mesh. The entire mixture is worked to the consistency of a smooth paste and applied in paste form by brushing or spreading to the surfaces of the article which is to be bonded. It is necessary to use this paste shortly after it is compounded and before any appreciable setting has been initiated. It may be pointed out that if the mixture is allowed to set, the viscosity of the paste will be increased to that extent which will make it substantially impossible to brush or spread it evenly on the work surface. Using formaldehyde as the setting agent, the mixture of the material being carried out at room temperature, the resulting adhesive composition should be used within a period of 20 to 30 minutes. This period may vary somewhat and still come within the spirit of the present invention, the criterion being that the composition should not be initially set up so as to increase its viscosity. The mixture even though initially set up somewhat will still bond effectively but it will be difficult to achieve uniformity of bond.

Instead of compounding a premixed adhesive utilizing formaldehyde as the setting agent, the adhesive may be compounded with a setting agent containing an active methylol compound of the character hereinbefore set forth. However, when the premixed adhesive is compounded with a material containing an active methylol compound, its application may be deferred for a longer period.

Satisfactory results have been obtained by using as a bond a premixed adhesive composition containing an active methylol compound and particularly polymethylol phenol, 12 to 24 hours after the preparation of the composition.

The premixed dihydroxy benzene aldehyde resin, containing a setting-up or hardening agent of the character herein set forth, is of value in repair operations such as in patching of wooden objects, particularly the surface of plywood aircraft, and is also useful in the manufacture of furniture and other wooden articles. The premixed adhesive composition of the present invention may be used not only for the bonding of wooden articles but for the bonding together of articles wherein metal and wood members are to be united, such as an aluminum magnesium alloy to laminated wood. The adhesive composition of the present invention may also be used to unite natural-occurring rubber or synthetic sulphur vulcanizable rubber, or rubber substitutes to base members which may include wood, leather, metal and laminated plastic stock, such as laminated wood and plywood. Further, synthetic plastics may be united together by the adhesive composition of the present invention.

It is within the province of the present invention to provide a flexible bond by incorporating in the adhesive compositions herein described a plasticizing agent in sufficient quantity to make the bond flexible. This is especially desirable when the material to be bonded is a flexible material, as for example rubber.

When the adhesive compositions herein set forth are to be used as a bond for flexible materials, typified by rubber or synthetic rubber or synthetic plastic, it is highly desirable that the adhesive composition be prepared using an organic solvent instead of water to dissolve the dihydroxy benzene aldehyde resin, the setting agent and the plasticizing agent, said organic solvent being a mutual solvent. Further, the solvent should exert no deleterious influence on the material being bonded. Examples of solvents which may be used are alcohols, including methanol, ethanol, propanol, and other higher alcohols; aliphatic ketones such as ethyl, methyl or butyl ketones, and the higher ketones; mixed ketones such as methyl ethyl ketone; aromatic ketones; acetone and in fact, any solution medium fulfilling the conditions herein set forth and which do not have any deleterious effect upon the reacting ingredients or upon the reaction or condensation product. An example of a plasticizer requiring the use of such solvents is rubber and synthetic rubber. It is particularly desirable to use rubber as a plasticizer when the herein-described resin adhesive composition is used for the bonding of sulphur-vulcanizable synthetic rubber, or other kinds of rubber or rubber substitutes, to metal, leather, synthetic plastics, wood and the like.

The above solvents are merely exemplary of suitable solvents which may be used. Broadly, any organic solvent may be used which will act as a mutual solvent for the mixed ingredients and which will not inhibit cold-setting of the adhesive composition, that is at temperatures preferably varying from about 30° to 60° or 70° F. and broadly varying between 30° F. and 200° F.

It is desired to point out that one of the members of a plurality of members which are to be united may be non-porous, as for example a metal surface, and then it is highly desirable prior to applying the dihydroxy benzene aldehyde resin together with its setting agent by any of the methods herein described, to coat the non-porous surface, as for example the metal surface, with a primer coating comprising a solution of the resin herein set forth, namely a dihydroxy benzene aldehyde resin, made from a mixture containing aldehyde radicals in an amount insufficient to cause the mix to set to an infusible, insoluble state, for the purpose of increasing the adhesion of the cold-setting adhesive composition produced as herein set forth. This primer solution is a relatively dilute one, as for example formed by dissolving 100 parts of the herein disclosed resin in 900 parts of solvent, which may be an aqueous solvent or an organic solvent. The latter may be any of the ordinary organic solvents or an inorganic solvent but is desirably an organic or inorganic solvent which may slightly etch the surface of the metal and thereby induce a very substantial locking of the thin primer to the metal member. After the primer coat is applied, preferably it is allowed to thoroughly dry. Whether the coating must be dried will of course depend upon the amount of liquid compound present therein. Thereafter, the composite adhesive composition, comprising a dihydroxy benzene aldehyde resin of the character herein set forth or a solution of the resin by itself, prepared as previously referred to, is applied over the primer coat in an amount varying between 7½ to 25 lbs. per 1,000 square feet of surface, taken on a dry basis. Thereafter the inner surface of the other member which is to be bonded to the metal member is treated in accordance with the above if it is a metal member or one which has the same characteristics as a metal member, or if it is a porous member such as one made from wood, the application of the primer coat may be omitted and the so-prepared second member united to the first member, all in accordance with the present invention.

It may be stated that when using a primer coat produced as set forth, that the pH of the aqueous solution functioning as the primer coating should be maintained within such a range that the resin will go into solution. Using a dihydroxy benzene aldehyde resin, made as herein set forth, and made from a mixture having present .67 molar parts of formaldehyde to 1.0 molar parts of resorcin, the pH of the aqueous priming solution should be controlled within a range varying from 5.0 to 7.0, so that the cooked and solidified brittle resin will go into solution in water at a concentration of 30% or lower. The primary discovery that has been made as to the priming coat is that in order to keep the resin compound in solution in water at low concentrations, the pH of the solution must be maintained within the appropriate range to effect this result, it being recognized, as stated, that this range will vary with the different resins produced from different ratios of formaldehyde to resorcin and it may be necessary, in some cases, to adjust the pH between 5.0 and 8.0 or 7.0 and 9.0.

In preparing the particular resin herein set forth, it is to be noted that the resin is dehydrated until it has a moisture content varying between .1 to 1%, taken on the weight of the finished resin. As far as the dehydration step is concerned, while a dehydrated resin functions admirably to carry out the present invention, it is not necessary that the resin be dehydrated. In other words, it may contain the proportions of water normally removed; it may contain additional water added at the end of the reaction period, or it may contain solvents in place of part or all of the added water. In other words, the particular dihydroxy benzene aldehyde resin herein set forth before being dehydrated contains about 25% of water. If the resin isn't dehydrated, then instead of dissolving 75 parts of the resin in 75 parts of water, 75 parts of the liquid resin may be dissolved in 25 parts of water, and the consistency of the resulting mixture will be the same as if a dehydrated resin had been dissolved in water in the amounts hereinbefore set forth.

The potential adhesive compositions herein set forth are characterized by the property of setting in the cold, that is at temperatures varying between about 30° F. and about 70° to 80° F., without the application of extraneous heat. However, while it is primarily desired that these resins be strictly cold-setting in character, it is within the province of this invention if necessary to accelerate the setting of the resin by applying a small increment, or increments, of heat up to 200° F. It has been discovered, when the herein described resin composition is used to bond two wooden members together, the bonding thereof to provide a glue joint of an adequate strength, as for example 200 to 325 lbs. per square inch, that the development of this bonding strength can be accelerated by slight heating, as by placing the assembled unit in a room such as a drying room which is heated from temperatures varying from 100° to 125° F. Of course under extraordinary circumstances, the temperature may be greatly increased, even to 200° F., but the adhesive compositions of the resin do develop an adequate bonding strength when cold set at temperatures varying from about 30° F. to about 70° to 80° F.

In the example given of the preparation of two-stage resin made by reacting resorcin with formaldehyde, a catalyst is used. However it is within the province of the present invention to use dihydroxy aldehyde resins which have been prepared without using the catalyst.

In carrying out the present invention, for the dihydroxy benzenes there may be substituted a monohydric benzene or phenol such as phenol per se, cresylic acid, xylenol and the like, in an amount which will not destroy the water solubility of the resulting resin adhesive. Usually the maximum amount of monohydric phenol which may be substituted without destroying the water solubility is in the neighborhood of 25% of the total phenolic body present in the original mix, taken on a molar basis.

While the present invention has been set forth in connection with utilization of resorcin as the dihydroxy benzene, it is within the province of the present invention to use catechol, hydroquinone and substitution products or derivatives thereof. The term "dihydroxy benzene compound" as used in the claims is intended to cover not only resorcin, catechol and hydroquinone, but also the substitution products and derivatives thereof. Examples of the substituted resorcins may include secondary alkyl resorcins, in which the alkyl member is a lower alkyl or a higher alkyl; resorcin ethers including monomethyl resorcyl ether; resorcin esters including resorcin disulphonic acid esters, and the like. In general, the 2, 4, 5 and 6 carbon atoms of the resorcin ring may have alkyl or aromatic radicals or chains substituted in place of the existing hydrogen atoms. The non-hydroxide carbon atoms of the catechol and hydroquinone ring may be substituted with alkyl or aromatic radicals or with a radical having both alkyl and aromatic constituents.

In producing the two-stage resin from resorcin and formaldehyde, as set forth in the example given, the formaldehyde is merely illustrative of a suitable aldehyde. Other aldehydes may be used for this particular step in the preparation of the resin adhesive, as for example acetaldehyde, paraldehyde, propionaldehyde, the butyl aldehydes, the furfuralaldehydes, and the like. Instead of using a single aldehyde, it is within the province of the present invention to react the dihydroxy benzene with a mixture of aldehydes such as a mixture of formaldehyde and butyl aldehyde. Dialdehydes may be used in place of the monoaldehydes. As a representative of the dialdehydes, glyoxal is set forth.

The dihydroxy benzene aldehyde resin adhesives herein disclosed and their equivalents, produced in accordance with the general disclosures of the present application, may be used in the production of aeroplane structures, boats, furniture, light structural sections such as beams and arches. The invention is of particular value in the production of laminated wood, plywood or wherever it is desirable to bond plies of cellulosic material to each other or to provide a laminated or panel structure which may comprise a layer of wood together with a layer of cotton fibers, cloth or asbestos. The plies which are bonded with the adhesive of the present invention may be inorganic in character, as, for example, asbestos.

It is desired to point out that the setting agent herein employed is one that acts relatively fast and this is distinctly characteristic of formaldehyde, which is exceedingly fast in its action, and of methylol-containing compounds, which while fast, are somewhat slower.

Having thus described the invention, what is claimed as new and desired to be secured by Letters Patent is:

1. The method of manufacturing plywood, comprising applying to certain of the plies a dihydroxy benzene-aldehyde resin adhesive base capable of cold-setting in the presence of a setting agent, said adhesive base being derived from a mixture of a dihydroxy benzene and an aldehyde in molecular proportions of less than one of the latter to one of the former, thereafter just prior to the assembly of the plies and the application of pressure thereto treating said resin adhesive base with a setting agent having present a reactive methylene-containing radical in an amount to set the resin adhesive base, assembling the plywood plies, and cold-setting the resulting adhesive while subjecting the assembly to pressure.

2. The method of bonding two members one to the other, comprising applying to at least one of said members a resorcin-aldehyde resin adhesive base capable of cold-setting in the presence of a setting agent, said adhesive base being derived from a mixture of resorcin and an aldehyde in molecular proportions of less than one of the latter to one of the former, thereafter just prior to the assembly of the members and the application of pressure thereto treating said resin adhesive base with a setting agent having present a reactive methylene-containing radical in an amount to set the resin adhesive base, assembling said members, and cold-setting the resulting adhesive while subjecting the assembly to pressure.

3. The method of manufacturing plywood, comprising applying to certain of the plies a resorcin-aldehyde resin adhesive base capable of cold-setting in the presence of a formaldehyde-liberating setting agent, said adhesive base being derived from a mixture of resorcin and an aldehyde in molecular proportions of less than one of the latter to one of the former, thereafter just prior to the assembly of the plies and the application of pressure thereto treating said resin adhesive base with a formaldehyde-liberating setting agent in an amount to set the resin adhesive base, assembling the plywood plies, and cold-setting the resulting adhesive while subjecting the assembly to pressure.

4. The method of bonding two members one to the other, comprising applying to at least one of said members a dihydroxy benzene-aldehyde resin adhesive base capable of cold-setting in the presence of a setting agent, said resin base being derived from a mixture of a dihydroxy benzene and an aldehyde in molecular proportions of less than one of the latter to one of the former, the resin adhesive base being incapable of setting and developing bonding strength until it has been subjected to treatment with the setting agent, thereafter just prior to assembling said members for adhesive union and the application of pressure thereto treating said resin adhesive base with a solution of a methylol-containing setting agent, the methylol component of which is active substantially immediately upon the methylol-containing setting agent being brought into contact with said resin adhesive base, said setting agent being present in an amount to set the resin adhesive base and cause the resulting adhesive and bonding medium to develop adequate bonding strength in a period not exceeding 16 hours, assembling the second member in contact with the resulting cold-setting adhesive medium, and cold-setting the assembly under pressure.

5. The method of bonding two members one to the other comprising applying to at least one of said members a dihydroxy benzene-aldehyde adhesive base capable of cold-setting in the presence of a setting agent, said resin base being derived from a mixture of a dihydroxy benzene and an aldehyde in molecular proportions less than one of the latter to one of the former, the resin adhesive being incapable of setting and developing its bonding strength until it has been subjected to treatment with the setting agent, thereafter just prior to assembly of said members for adhesive union and the application of pressure thereto treating said applied resin adhesive base with a setting agent having present an active methylene-containing radical, said setting agent being present in an amount which will cold-set said resin adhesive base and cause the resulting adhesive and bonding medium to develop adequate bonding strength in a period not exceeding 8 hours, assembling the second member in contact with the adhesive and bonding medium, and cold-setting the latter and the assembly under pressure.

6. The method of bonding two members one to the other comprising applying to at least one of said members a dihydroxy benzene-aldehyde adhesive base capable of cold-setting in the presence of a setting agent, said resin base being derived from a mixture of a dihydroxy benzene and an aldehyde in molecular proportions less than one of the latter to one of the former, the resin adhesive being incapable of setting and developing its bonding strength until it has been subjected to treatment with the setting agent, thereafter just prior to assembly of said members for adhesive union and the application of pressure thereto treating said applied resin adhesive base with a setting agent having present an active hydroxy methylene-containing radical, said setting agent being present in an amount which will cold-set said resin adhesive base and cause the resulting adhesive and bonding medium to develop adequate bonding strength in a period not exceeding 8 to 16 hours, assembling the second member in contact with the adhesive and bonding medium, and cold-setting the latter and the assembly under pressure.

PHILIP HAMILTON RHODES.